Sept. 24, 1957 A. J. POOLE 2,807,242
COMBUSTION APPARATUS
Filed May 28, 1954 3 Sheets-Sheet 1

INVENTOR
Arthur J. Poole
BY
ATTORNEY

Sept. 24, 1957     A. J. POOLE     2,807,242
COMBUSTION APPARATUS.

Filed May 28, 1954     3 Sheets-Sheet 3

INVENTOR
Arthur J. Poole
BY
ATTORNEY

United States Patent Office 2,807,242
Patented Sept. 24, 1957

2,807,242

COMBUSTION APPARATUS

Arthur J. Poole, Belleville, N. J., assignor to The Babcock & Wilcox Company, New York, N. Y., a corporation of New Jersey Application May 28, 1954, Serial No. 433,199

3 Claims. (Cl. 122—235)

The present invention relates to combustion apparatus and more particularly to apparatus for burning a low heat content fuel for heat exchange purposes.

During the catalytic refining of petroleum the catalyst becomes coated with carbon, loses its effectiveness and must be reactivated or regenerated for use in petroleum processing. The regeneration of the catalyst involves the introduction of oxygen containing gases into a hot bed of the carbon coated catalyst to burn the carbon coating. The gases resulting from catalyst regeneration ordinarily contain a small percentage of carbon monoxide and some hydrocarbons, in addition to large volumes of inert gases such as carbon dioxide, nitrogen and water vapor. A typical heat content of the gases passing from a catalyst regenerator lies in the range of from 6 to 15 B. t. u.'s per cubic foot (standard temperature and pressure) of gas, with the gases available at a temperature of the order of 700 to 800° F. or higher.

The waste gases from a catalyst regenerator ordinarily cannot be burned under self-sustaining combustion conditions due to the low heat content thereof. Such gases, however, can be burned in furnaces when temperatures are maintained in the range of 1500 to 1600° F. Waste gas ignition temperatures are attained by the use of a supplementary high heat content fuel, such as natural gas, fuel oil, or the like which is delivered to the furnace. Heretofore, it has been found difficult to combine the combustion of the high heat content fuel and the low heat content fuel waste gases in the same furnace so that the inert gases of the low heat content fuel will not suppress combustion of the high heat content fuel.

In accordance with my present invention I provide a combustion chamber or furnace wherein a high heat content fuel is introduced to an intermediate portion of the furnace so that the radiant heat emitted during the combustion of the fuel aids in igniting the low heat content fuel which is separately introduced into the lower portion of the furnace. Advantageously, the low heat content gaseous fuel is introduced into the lower portion of the furnace in such a manner as to encourage violent mixing of the fuel and the gaseous products of combustion. This is accomplished by introducing the low heat content fuel in directions which cause a plurality of swirling streams to form in the lower part of the furnace. The swirling streams are arranged to create eddy currents and reversals in the direction of movement of the gases with the result the unburned waste gases are intimately mixed with the products of combustion and introduced in the intermediate portion of the furnace so that all of the combustible constituents in both fuels attain intimate contact with the oxygen necessary for combustion while above their ignition temperature.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Figure 1:
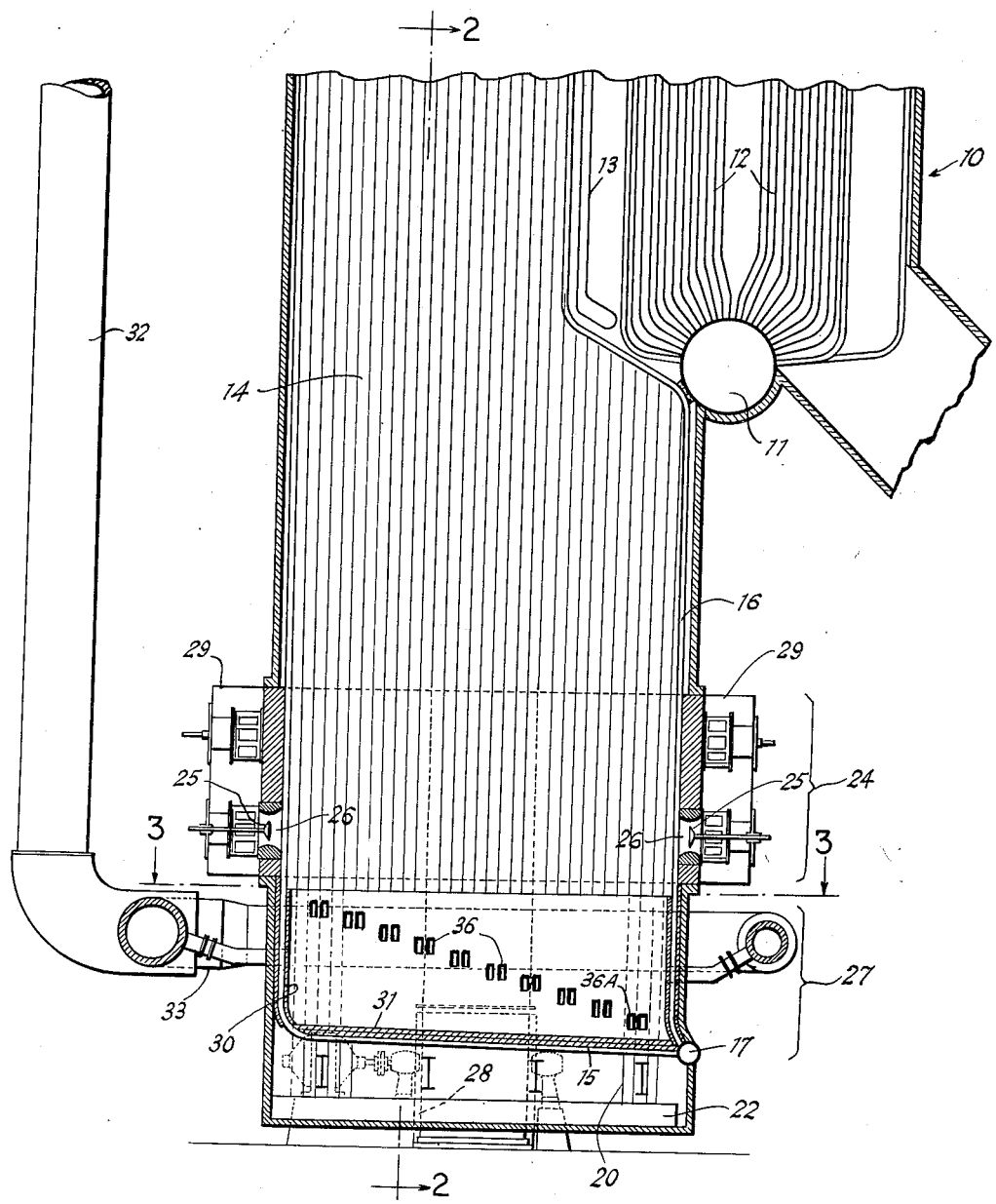
Fig. 1 is an elevation in section, of a furnace chamber constructed in accordance with the present invention.

While the invention is illustrated as applied to the combustion of the waste gases resulting from the regeneration of a catalyst, it will be understood that the invention is equally applicable to the combustion of other low heat content gases which require an elevated temperature for ignition and self-sustaining combustion.

As shown in the drawings the embodiment of the invention includes a vapor generator 10 where only the lower drum 11 and the lower portions of the convection tube banks 12 and the superheater 13 are shown. A vapor generator of this general type is disclosed in the Woolley U. S. Patent 2,633,109. The furnace 14 is upwardly elongated and is bounded by tube and refractory walls, including the furnace bottom. The tubes are connected into the circulatory system of the vapor generator. The front and rear wall tubes, 15 and 16, respectively, are connected at their lower ends with a common horizontally disposed header 17, which is supplied with liquid from downcomers (not shown); and with the upper ends of the tubes connected into the steam space of an upper steam and water drum (not shown). The side wall tubes 20 and 21 are connected at their lower ends with side wall headers 22 and 23 which are also supplied with liquid through downcomers (not shown). The upper ends of the side wall tube are connected with upper headers (not shown) and with the upper steam and water drum in accordance with good design practice.

The intermediate portion 24 of the furnace 14 is provided with a plurality of spaced fuel burners 25 which are inserted in wall ports 26 formed in the front and rear wall of the furnace 14. The front and rear wall tubes 15 and 16 are laterally displaced to define the ports. It will be appreciated that the number of burners 25 is dependent upon the desired fuel input of high heat content fuel desired for any particular vapor generator installation. It will also be appreciated that the burners may be installed in only one wall of the furnace, or, as shown in Fig. 1, the burners may be installed in both the front and rear wall, or in three or all four walls.

As shown, secondary combustion air is delivered to the burners 25 from a forced draft fan 28 which discharges a controlled flow of air to a housing 29 mounted on the interior of the furnace walls and enclosing the burners. The burner may be of the type disclosed in the Lucke U. S. Patent 2,242,797.

In accordance with the invention, the low heat content gases are introduced into the furnace 14 in the lower portion 27 thereof, below the intermediate portion 24 and the fuel burners 25. Since one of the prerequisites of successful combustion of the low heat content fuel relates to the necessity of maintaining a high ignition temperature in the furnace, it is desirable to provide a refractory coating 30 on the tubes 15, 16, 20, and 21, in the lower portion 27 of the furnace. The furnace floor, which is formed by a horizontally inclined extension of the front wall tubes 15, is also covered by refractory material 31.

The refractory coating 30 in the lower portion 27 of the furnace 14 may be formed by the use of "C"-tile embracing the upright tubes of the wall and presenting a continuous refractory surface inwardly of the furnace 14.

Figure 3:
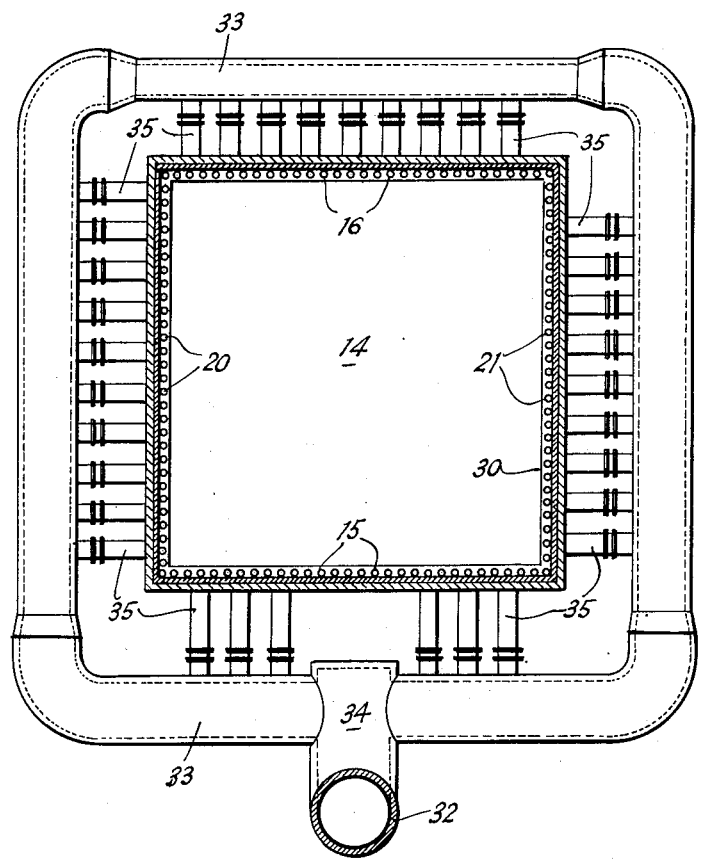
Fig. 3 is a plan, in section, taken on the line 3—3 of Fig. 1.

As shown in the drawings, the waste gas from the catalyst regenerator kiln passes through an insulated duct 32 to a manifold 33 surrounding the lower portion 27 of the furnace 14. As shown particularly in Fig. 3, the manifold 33 is provided with an inlet 34 centrally positioned laterally of the front wall of the furnace. Sections of the manifold 33 lead from both sides of the inlet 34 with both sections having the same internal dimensions. The manifold is progressively reduced in diameter on both sides of the furnace to join adjacent the rear wall of the furnace. The manifold 33 is provided with a plurality of stub off-take pipes 35 connected with burner ports 36 inserted in the space between the tubes on all sides of the furnace.

The gas inlet ports 36 are each upwardly elongated and have a transverse width capable of insertion between adjacent tubes of the furnace walls without the necessity for displacing the tubes laterally to provide sufficient clearance for the inlet ports. Conveniently, the ports 36 are arranged in pairs, with each pair provided with fuel gas from a separate valved stub pipe 35 leading from the gas manifold 33.

As shown particularly in Fig. 1, the ports are arranged across the side walls of the furnace in a diagonal direction. One pair of ports 36A is positioned adjacent the bottom 31 of the furnace in one corner of the furnace wall formed by the intersection of the side wall tubes 20 and the rear wall tubes 16. The adjacent pairs of gas inlet ports are spaced with an increasing dimension relative both to the furnace bottom 31 and the rear wall tubes 16 to the upper corner of the lower portion 27 adjacent the front wall tubes 15.

The opposite side wall of the furnace bounded by the tubes 21 is likewise provided with pairs of fuel inlet ports (not shown) arranged diagonally of the furnace wall, with the lowermost pair of ports positioned adjacent the front wall tubes 15 of the furnace.

Figure 2:
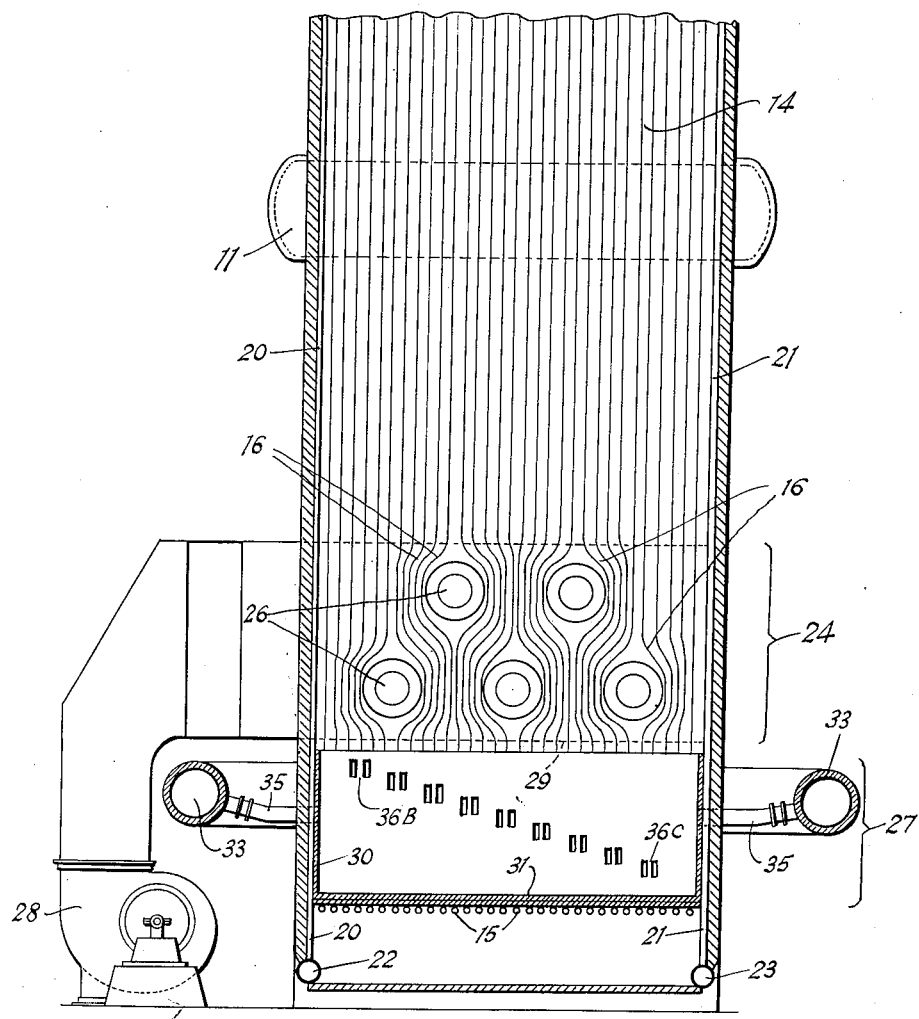
Fig. 2 is an elevation, in section, taken on the line 2—2 of Fig. 1.

Referring to Fig. 2, the rear wall of the furnace bounded by the tubes 16 is likewise provided with pairs of ports 36 arranged on the diagonal with the uppermost pair of ports 36B located adjacent the side wall tubes 20 of the furnace, and adjacent pairs spaced downwardly from the corner ports to a position adjacent the intersection of the bottom 31 and the side wall tubes 21. The front wall of the furnace is likewise provided with pairs of ports 36 arranged in a manner similar to that of the rear wall.

With the construction described, the lowermost port 36C in both the front and rear walls will be spaced at the greatest distance from the corresponding lowermost ports 36A in the side walls.

With the port arrangement described, the streams discharged through the fuel inlet ports 36 enter the portion 27 of the furnace at a high velocity, i. e. of the order of 10,000 feet per minute. The high velocity streams of gas in the lower levels of the furnace portion 27 will rotate in a counter-clockwise direction when viewed from above, while in the upper levels of the furnace portion 27 the direction of gas movement will be clockwise direction, when viewed from above. At at intermediate level in the lower portion 27 of the furnace, the gas streams from all sides will directly impact within the furnace and violently agitate the entering streams of combustible gases, as well as the combustion products generated in the lower portion of the furnace. As a result of the changed directions of the gas streams introduced through the ports 36, the combustibles will be thoroughly mixed and heated as they rise into the furnace portion 24 at the level of the fuel burners 25.

By the way of example, in one installation constructed and operated in accordance with the disclosed invention the vapor generator had a furnace horizontal cross-section dimension of 18 by 14 feet, and a vapor generating capacity of 190,000 pounds of steam per hour when burning fuel oil and waste gas. The waste gas was delivered to the furnace 14 at a rate of approximately 150,000 pounds per hour, with a total B. t. u. content of approximately 58,000,000. Fuel oil was simultaneously delivered to the furnace at a rate of approximately 12,650 pounds per hour with a B. t. u. content of approximately 232,000,000. When waste gas was not available, as for example when the catalytic cracking unit was not in operation, the vapor generator was operated at a rate of 220,000 pounds of steam per hour with fuel oil alone. It is apparent that refinery or natural gas can be substituted for fuel oil in the operation of the furnace.

While in accordance with the provisions of the statutes I have illustrated and described herein a preferred embodiment of the invention, those skilled in the art will understand that changes may be made in the method of operation and form of the apparatus disclosed without departing from the spirit of the invention covered by my claims, and that certain features of the invention may sometimes be used to advantage without a corresponding use of other features.

What is claimed is:

1. Apparatus for burning fuel in suspension which comprises walls defining an upright furnace chamber, burner means for introducing a high heat content fuel and combustion air into an intermediate height portion of said furnace, and a plurality of fuel inlet ports positioned and arranged to introduce a low heat content fuel into the lower portion of said furnace, some of said fuel inlet ports being positioned in an inclined row extending substantially across the full width of each furnace wall, and having the fuel inlet ports at one end of said row introducing the fuel horizontally into said furnace adjacent an adjoining furnace wall and vertically spaced from the fuel introduced horizontally through the end inlet ports of an inclined row of ports positioned in said adjoining furnace wall.

2. Apparatus for burning a fuel in suspension which comprises walls defining an upright furnace chamber, burner means for introducing a high heat content fuel and combustion air into an intermediate height portion of said furnace, and a plurality of fuel inlet ports positioned and arranged to introduced a low heat content fuel into the lower portion of said furnace, said fuel inlet ports being diagonally positioned in a row extending substantially across each of the walls of said furnace with the rows of ports in opposite walls being oppositely inclined whereby said fuel substantially fills said furnace chamber and tends to whirl in one generally horizontal direction in the lower portion of said chamber and in an opposite direction in an upwardly spaced portion of said combustion chamber.

3. In a fluid heating unit, tube and refractory material defining the walls of a combustion chamber, the tubes of said combustion chamber walls being connected in the circulatory system of said fluid heating unit, burner means positioned in opposing walls of said combusion chamber intermediate the height of said chamber, refractory means coating the interior surface of said walls in the lower portion of said combustion chamber below said burner means, and fuel inlet ports positioned in the walls of said combustion chamber beneath said burner means, said fuel inlet ports being diagonally spaced in a single row across substantially the width of each of said walls in reverse relationship to the diagonal relationship of the spacing of the fuel inlet ports in an opposite furnace wall whereby said fuel substantially fills said furnace chamber and tends to whirl in one generally horizontal direction in the lower portion of said chamber and in an opposite direction in an upwardly spaced portion of said combustion chamber.

References Cited in the file of this patent

UNITED STATES PATENTS

| 1,966,195 | Bailey | July 10, 1934 |
| 2,143,820 | Payn | Jan. 10, 1939 |
| 2,551,145 | Loy | May 1, 1951 |